United States Patent
Whistle

[11] Patent Number: 5,099,597
[45] Date of Patent: Mar. 31, 1992

[54] FISHING NET FOR SPORTSMEN

[76] Inventor: Joy W. Whistle, R.D. #2, Endicott, N.Y. 13760

[21] Appl. No.: 653,381

[22] Filed: Feb. 11, 1991

[51] Int. Cl.$^5$ ............................................. A01K 77/00
[52] U.S. Cl. .......................................... 43/11; 43/12; 440/109
[58] Field of Search ........................... 43/11, 12, 21.2; 440/104, 106, 108, 109; 248/514, 538

[56] References Cited

U.S. PATENT DOCUMENTS

| | | | |
|---|---|---|---|
| 1,532,367 | 4/1925 | Bockman | 440/109 |
| 2,349,692 | 5/1944 | Anderson | 440/109 |
| 2,645,874 | 7/1953 | Collins | 43/12 |
| 2,817,175 | 12/1957 | Morris | 43/11 |
| 2,990,642 | 7/1961 | Bloom | 43/21.2 |
| 3,089,674 | 5/1963 | Bastie | 248/514 |
| 4,207,700 | 6/1980 | Marleau | 43/12 |
| 4,263,864 | 4/1981 | Carter | 43/12 X |
| 4,815,227 | 3/1989 | Flanders | 43/11 |
| 4,894,943 | 1/1990 | Allen | 43/6.5 |
| 5,020,464 | 6/1991 | Rodrigues | 43/11 X |

*Primary Examiner*—Richard K. Seidel
*Assistant Examiner*—Patty E. Hong
*Attorney, Agent, or Firm*—Salzman & Levy

[57] ABSTRACT

The present invention features a sportsman's fishing net apparatus having a shaft for thrusting the net into the moving current for the purpose of snaring a hooked fish. The net is framed upon a tubular ring-like member disposed on a distal end of the shaft. A flotation device keeps the upper part of the tubular member afloat in the water. The flotation device allows the net to maintain the same position with respect to the surface of the water, despite the induced wave motions. The shaft of the net apparatus is slidable within a collar. The collar is mountable upon trunnions attached to a bracket affixed to the side of the boat. The trunnions allow the shaft to rotate about the bracket affixed to the side of the boat, thus allowing movement with the wave motions. In one embodiment of the apparatus, the shaft is articulated in a mid-portion thereof, for the purpose of drawing the net out of the water without slidably withdrawing the net or detaching the shaft collar from its swivel mounting. A tether or cord member affixed to the tubular frame of the net is drawn towards the fisherman, causing a distal section of the shaft to bend about a mid-portion hinge. When the cord is drawn inward, the distal section automatically lifts and rotates the tubular frame towards the boat. A fish that has been captured in the net is then pulled from the water, and the fisherman can easily retrieve the netted catch.

20 Claims, 4 Drawing Sheets

FISHING NET FOR SPORTSMEN

FIELD OF THE INVENTION

The invention features a fishing net apparatus for sportsmen that reduces the effort to land a hooked fish, and more particularly to an improved fishing net device that reduces or eliminates the forces created upon the angler's out-stretched arm when he dips the net into the water to land, retrieve or net a catch. The fishing net of this invention, therefore, provides greater ease of handling and retrieving a fish, and consequently improves the enjoyment of the sport.

BACKGROUND OF THE INVENTION

A common problem with sports fishing is the difficulty of bringing the fish into the boat after hooking a large catch. Hand-held fishing nets have been in use for some time, and provide an easy way to net and handle the slippery prey. However, the usual procedure is to put the net in the water in front of the fish and dip the fish from underneath. In many instances, presenting the net in front of the fish causes it to exert utmost effort to break loose. A good many fish are lost in this manner. This method of netting also becomes a very complicated task where two fish are hooked on one line, one fish disposed on the bottom line, and the other disposed on the slip line. In such a situation, the fish are generally about four feet apart. More often than not, one of the fish is lost during netting. A surer way to net any fish, particularly multiples, is to bring the fish along side the moving boat. But this procedure is strenuous, and creates other problems for a lone fisherman.

A catch will often elude capture at the last minute, as the angler tries to net it. Netting difficulties are increase if the boat is kept at trolling speed.

One of the problems with netting a fish is that the fisherman is often trying to accomplish several tasks at once. While the sportsman is trying to guide the hooked fish into the net with one hand, he often finds it difficult to hold the net steady with the other hand as the net is dipped into the water. It is difficult to hold the net in a receptive position as the boat bobs up and down from the tidal action of the waves. Additionally, the currents and the forward movement of the boat cause a backward force upon the net as it is thrust into the water. This backward force severely strains the muscles of the out-stretched arm holding the net.

In addition, a twisting force is experienced by the sportsman as he dips the net into the water. The twisting force is the result of the backward force acting upon the bottom peripheral edge of the frame of the net. The backward force creates a torque about the shaft axis of the net. This torque produces a twisting force upon the out-stretched arm in addition to the aforementioned backward force. The two forces act simultaneously upon the forearm muscles of the fisherman. The combined forces prevent steady manipulation of the net and often force the fisherman to lose the catch. Even if the fish is landed, the constant strain of netting a plurality of fish in this manner frequently results in subsequent painful forearm tenderness.

Many an experienced sportsman will be found to complain of injury to his arm after a successful day of netting fish in this fashion. Fishermen have been long suffering with the aforesaid problem and have usually thought of it as the necessary price to pay for enjoying their sport.

It should not be necessary to incur injury in the practice of any sport. It is known, for example, that avid runners often experience shin splints. But this condition is often alleviated by running on softer surfaces or using better shock absorbing running shoes. It is also common for tennis players to experience tennis elbow, resulting from the dynamic forces created when the tennis ball hits the racket outside of the percussion zone. Yet the strain upon the tennis player's elbow has been alleviated by designing tennis rackets with a wider zone of percussion.

With the aforesaid philosophy in mind, the invention was conceived as a means of reducing or eliminating the forces created when a sports fisherman dips the net into the water to net a hooked fish alongside of a moving boat.

The improved fishing net of the invention provides a new net design that effectively eliminates and reduces the simultaneous backward and torque forces created by the moving current upon the net as it is inserted into the water.

In addition, the present invention provides a netting apparatus that allows the sportsman to operate the net with one hand, while he releases the fish backward into the net with the other hand.

In U.S. Pat. No. 4,894,943, issued on Jan. 23, 1990 to Allen et al, a method and apparatus for gathering fish from the bunt of a net is illustrated. This patent describes a dual net device wherein the catch is entrained in a first net while a second net is used to scoop the fish therefrom. Such an apparatus is utilized mainly for commercial fishing where there is a great plurality of fish entrained in the net. While the purpose of the illustrated apparatus is to facilitate the placement of the catch within the boat, there is no disclosed purpose to alleviate the strain upon the out-stretched arm of the individual lifting the fish out of the first net. This is so because the fish in the first net have already been netted and the second net is not subjected to the same forces which the current invention is designed to alleviate.

In U.S. Pat. No. 4,815,227, issued on Mar. 28, 1989 to Flanders, Sr., for an Anti-Driving Fish Landing Net, a fishing net is depicted having the apex of its netting attached to a slidable section of the net handle. When the slidable member is drawn towards the fisherman, the bottom of the net is drawn flat against the net frame. Such a device allows the net to be dipped into the water without the net becoming entangled in the path of the hooked fish, thus causing a possible loss of the catch.

A collapsible netting frame is shown in U.S. Pat. No. 4,207,700, issued on June 17, 1980 to Marleau. The net is designed with a triangular frame, two sides of which collapse by telescoping action similar to the opening and closing of an umbrella.

A fisherman's landing net with a hinge disposed in a mid-portion of the handle is depicted in U.S. Pat. No. 2,645,874, issued on July 21, 1953 to Collins. The hinge allows the handle to bend about its middle in order to be carried over the shoulder of the fisherman.

SUMMARY OF THE INVENTION

In accordance with the present invention, there is provided a sportsman's fishing net apparatus having a shaft for thrusting the net into the moving current for the purpose of netting a hooked fish. The net is framed upon a tubular ring-like member disposed on a distal end of the shaft. A flotation device keeps the upper part of the tubular member afloat in the water. The flotation device allows the net to maintain the same position with respect to the surface of the water, despite the induced wave motions.

The shaft of the net apparatus is slidable within a collar. The collar is mountable upon trunnions attached to a bracket affixed to the side of the boat. The trunnions allow the shaft to rotate about the bracket affixed to the side of the boat, thus allowing movement with the wave motions.

In one embodiment of the apparatus, the shaft is articulated in a mid-portion thereof, for the purpose of drawing the net out of the water without slidably withdrawing the net or detaching the shaft collar from its swivel mounting. A tether or cord member affixed to the tubular frame of the net is drawn towards the fisherman, causing a distal section of the shaft to bend about a mid-portion hinge. When the cord is drawn inward, the distal section automatically lifts and rotates the tubular frame towards the boat. A fish that has been captured in the net can then be pulled from the water, and the fisherman can easily retrieve the netted catch.

The tether can be tied about a capstan in order to free the hands of the fisherman. The fish net device of the invention allows a lone fisherman to reel in his catch easily, since only one hand is required to work the net apparatus.

The water current and/or the movement of the boat directs the fish toward the net, and automatically forces the fish into the net without the need for external effort by the angler. The net being anchored upon the swivel mounting does not cause any injury to the forearm of the fisherman. The flotation device allows the net to remain in the water unattended until the catch is directed into the net. The netted fish can be retrieved by sliding the shaft through the swivel mounting, and/or bending the shaft to raise the fish out of the water toward the boat.

It is an object of this invention to provide an improved fish net device wherein the netting procedure for netting a catch is simplified.

It is a further object of this invention to provide a fish net apparatus that can be operable with one hand.

It is another object of the invention to provide a fish net device that will eliminate or substantially reduce injury to the sportsman.

These and other objects of this invention will become more apparent, and will be better understood with reference to the subsequent detailed description considered in conjunction with the accompanying drawings.

DESCRIPTION OF THE PREFERRED EMBODIMENT

Generally speaking, the invention features a netting device for retrieving hooked fish from the water, the apparatus having means for maintaining the net in an unattended position for automatic fish retrieval. The net is maintained at a constant level with respect to the surface of the sea by means of a flotation device. The fish is directed into the net by either the forward motion of the boat or the movement of the current. The apparatus allows the fisherman to lift the net and fish from the water and rotate them towards the boat with the use of only one hand.

For the purpose of clarity, similar elements will have the same designations throughout the figures.

Figure 1:
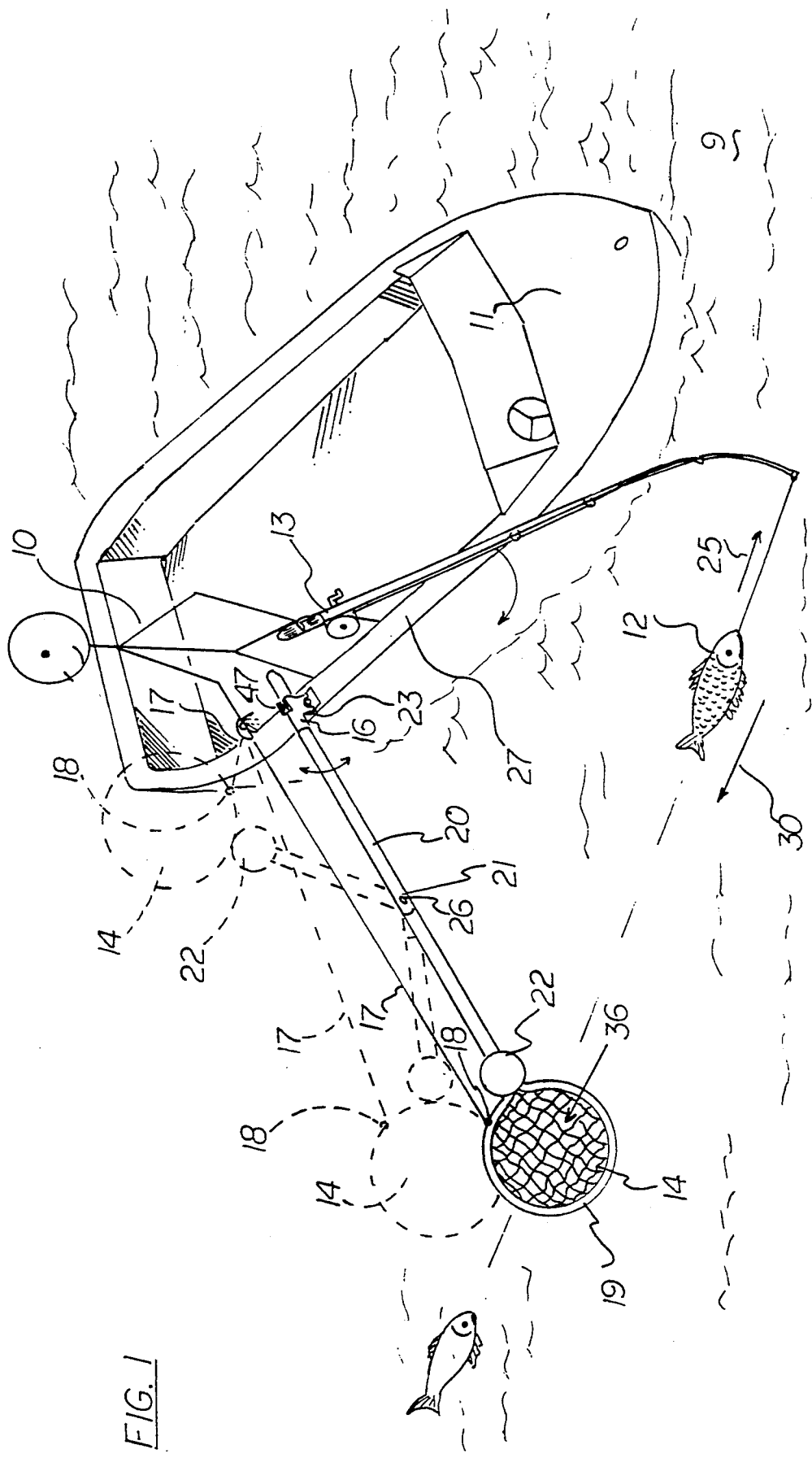
FIG. 1 illustrates an in situ, front, oblique view of the fishing net apparatus of this invention.

Now referring to FIG. 1, a fisherman 10 is shown standing in a boat 11 that is floating, or idling in a slow forward direction in sea 9. The fisherman has just caught a fish 12 with his fishing rod 13. The fisherman 10 has just reeled the fish 12 alongside the boat 11 to a position ahead of the net 14, and then has released the net 14 into the water.

The fisherman 10 is drawing the fish 12 against the current in front of the net 14 with his left hand, as shown by arrow 25. The fisherman holds a tether line 17 in his right hand, which is attached to the frame 19 of the net 14 at point 18. After the fish 12 is netted, the fisherman 10 pulls on the tether 17, causing the shaft 20 to bend about a hinge pin 26, allowing the net 14 to lift out of the water 9, and rotate towards the boat 11, as illustrated in phantom.

The net 14 is disposed upon a hollow, tubular, ring-like frame 19 which is made of aluminum. The frame 19 is mounted on the end of a hollow, aluminum shaft 20. The shaft 20 is articulated about a hinge 26, disposed in a mid-portion 21 thereof. A flotation ball 22 is attached to the shaft 20 where it meets the frame 19, as illustrated. The flotation ball may also take the form of a flotation collar 33 (FIG. 3) attached to an upper section 31 of the frame 19.

Figure 4:
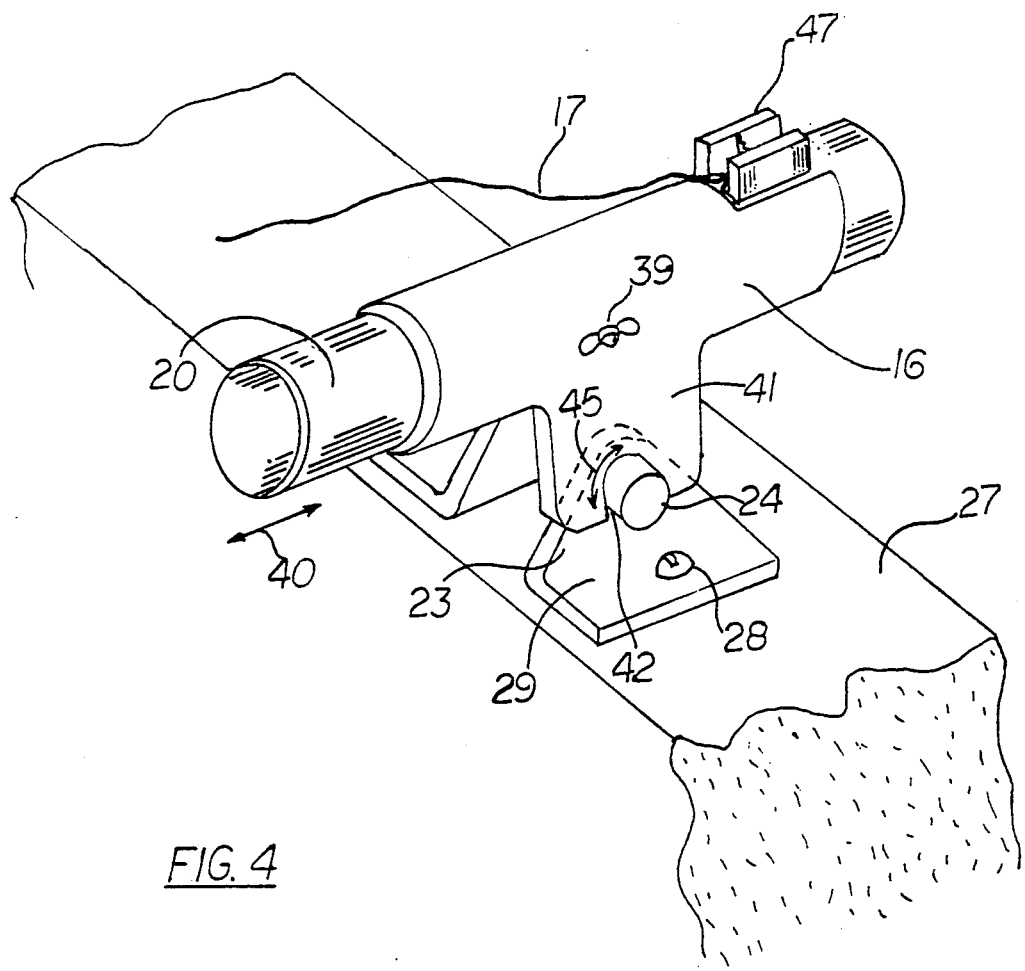
FIG. 4 is a perspective view of the collar mechanism of the fishing net apparatus illustrated in FIG. 1.

The shaft 20 is slidably movable (arrows 40, FIGS. 2 and 4) within a collar 16, for the purpose of thrusting the net 14 into the water 9. The position of the shaft 20 within the collar 16 can be fixed by means of a wing-nut 39 disposed thereon, as illustrated in FIG. 4. The collar 16 is removably mounted upon two trunnions 24 projecting from bracket 23. Bracket 23 is affixed to the side 27 of the boat 11 by screws 28 running through flange sections 29 of bracket 23.

Figure 2:
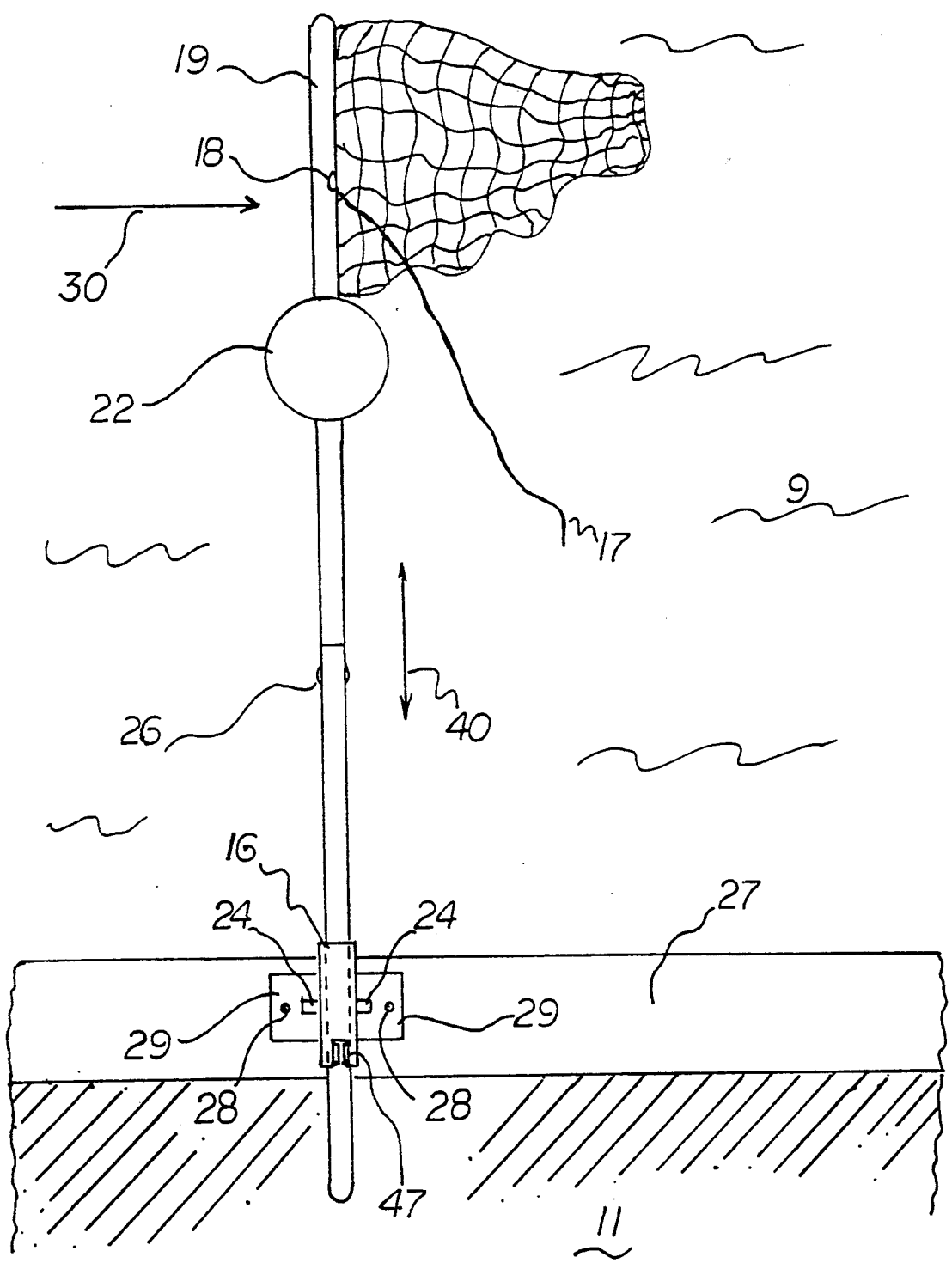
FIG. 2 depicts a top view of the fishing net apparatus of FIG. 1.

When the fish 12 is in position, as shown in FIG. 1, a simple wrist movement by the fishermen 10 causes the fish 12 to be drawn into the net 14 automatically, under the movement of the current past the boat, and/or the forward movement of the boat 11 with respect to the water 9, as shown by arrow 30 in FIGS. 1 and 2.

Figure 3:
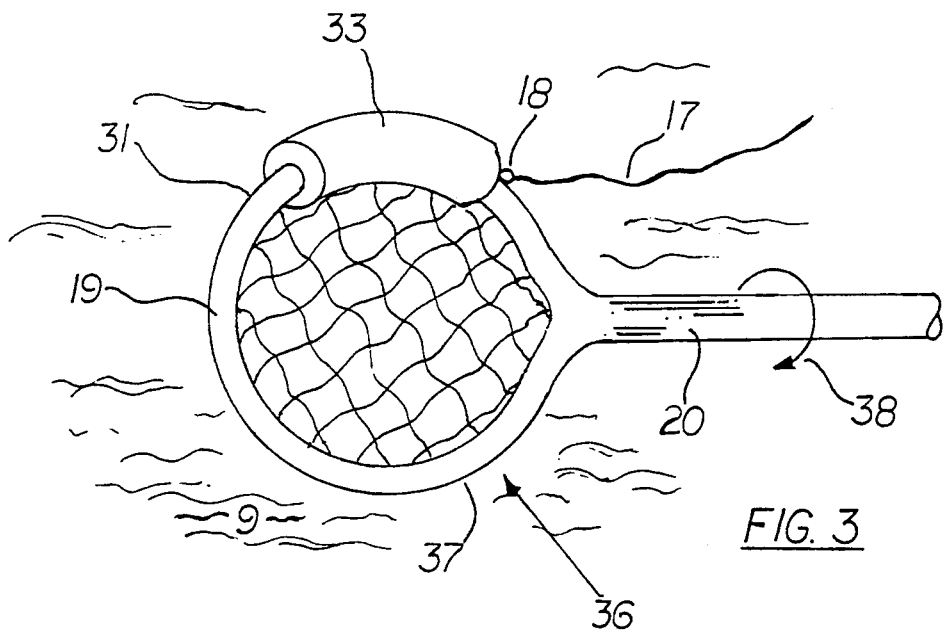
FIG. 3 shows a partial, front view of an end section of the fishing net apparatus of FIG. 1.

The net 14 floats within the sea 9 with its upper portion 31 of frame 19 evenly disposed with respect to the surface of the sea, as illustrated in FIG. 3.

As the water runs past the net 14, a force (arrow 36, FIG. 3) is exerted on the lower portion 37 of the frame 19 of net 14. This force in turn exerts a simultaneous twisting torque (arrow 38) and a backward force upon shaft 20. If the shaft 20 were hand-held, these forces would make control of the net 14 difficult to maintain. The invention, however, provides a means to hold the shaft in place via the combination of the collar 16 and the bracket 23. The combination is shown in greater detail in FIG. 4.

As aforementioned, the shaft 20 slides within collar 16. A wing-nut 39 fixes the shaft position with respect to the collar 16. The collar 16 has a lower extension 41 containing two slots 42 on either side thereof. The trunnions 24 projecting from the bracket 23 fit within the slots 42, thus allowing the collar 16 to swivel (arrows 45) with respect to the edge 27 of boat 11. The bracket 23 has two flanges 29 that rest upon the edge 27 of the boat. Screws 28 fix the flanges to the boat 11.

Once the net 14 is thrust into the water 9, the wing-nut 39 is tightened, thus fixing the position of shaft 20. The net then floats unattended, and the shaft 20 swivels (arrow 45) via collar 16 as the boat 11 bobs up and down in the sea 9. When a fish 12 is drawn into net 14, the angler pulls on the tether 17, causing the net to rotate towards the boat. A V-shaped wedge 47 mounted upon the shaft 20 can be used for holding the tether in place. After placement of the tether 17 in the wedge 47, the fish can be retrieved from the net 14. The net is also carried in this position while trolling.

Figure 5:
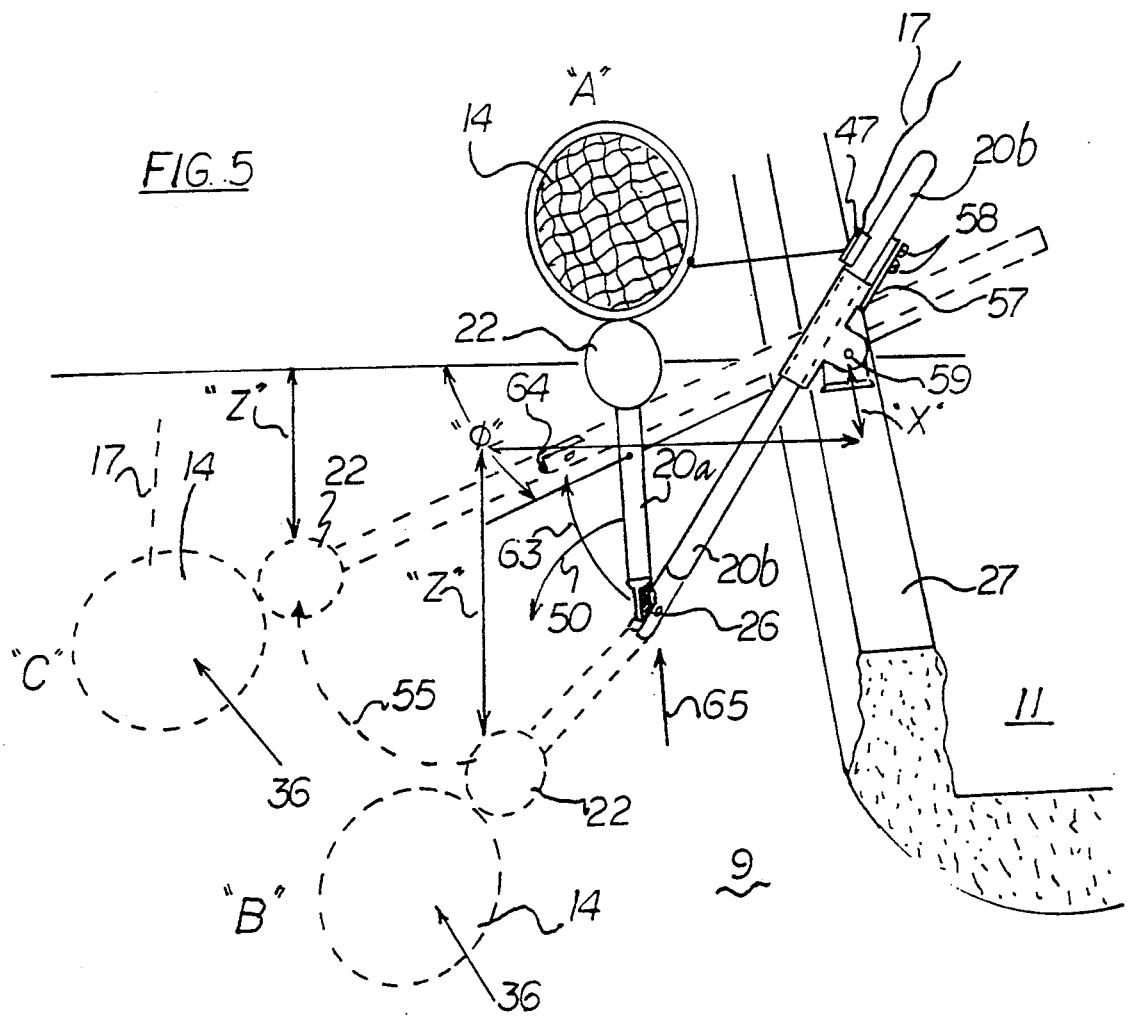
FIG. 5 is an in situ, front view of an alternate embodiment of the fish net apparatus shown in FIG. 1, with the net depicted in several operating positions, two of which are shown in phantom.

A variation of the embodiment shown in FIG. 1 is shown in FIG. 5 wherein the axis of hinge 26 is rotated forward at some angle "φ" with respect to the orientation clip 57.

From the trolling position "A", the net 14 is allowed to drop in water 9 by releasing a short tether 17 from wedge 47. When net 14 is released, net 14 and the lower portion 20a of shaft 20 rotate counter-clockwise (arrow 50) about hinge pin 26 until net 14 enters water 9 at position "B". Thereafter water 9 exerts a force (arrow 36) on net 14 causing it to move along a level path to the position "C". Simultaneously, this creates a vertical force (arrow 65) at hinge 26 causing shaft 20b to rotate clockwise about pin 59 and causing hinge pin 26 to move along a path shown as (arrow 63). Thus handle or shaft 20 is automatically straightened and extended maximum without assistance from fisherman 10. Shaft 20b is prevented from rotating past the position shown (a straight line major axis of shaft 20) by an interference point or stop 64 on hinge 26.

Figure 4A:
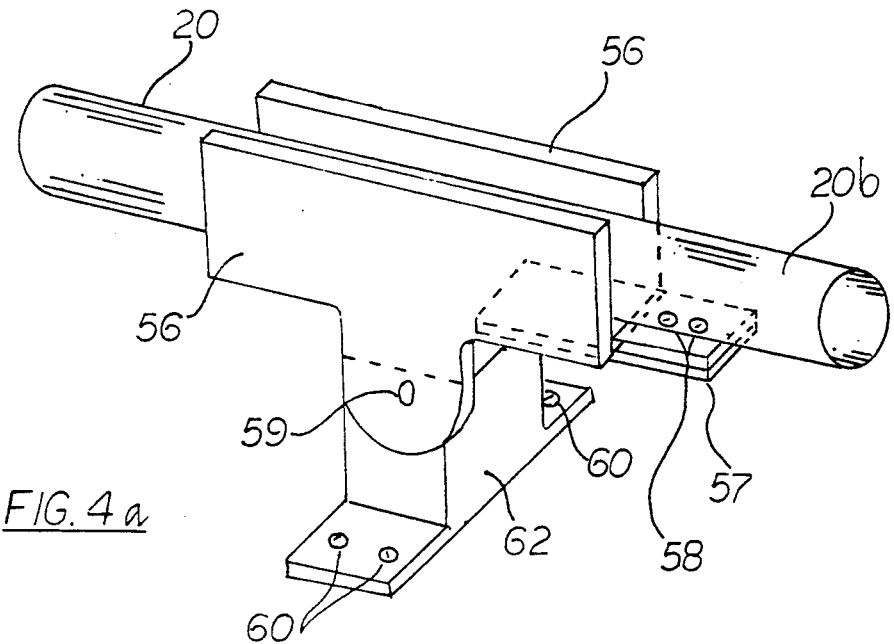
FIG. 4a is an alternate embodiment of the collar mechanism shown in FIG. 4, also depicted in perspective view.

After a fish is in net 14, fisherman 10 pushes down on the end of shaft 20, pivoting shaft 20 about pin 59 and lifting net 14 out of the water 9. Fisherman 10 then retracts the net 14 by sliding shaft 20 in channel 56 (FIG. 4a). Fisherman 10 then removes shaft 20 from channel 56 at will.

An alternate embodiment of the collar mechanism of FIG. 4 is illustrated in FIG. 4a. The collar can be shaped as a U-shaped channel 56. The top portion 20b contains a clip 57 that is attached thereto by screw fasteners 58, depicted in better detail in FIG. 5. The clip 57 is used to orient shaft 20 within the channel 56. Channel 56 is rotatively movable about hinge pin 59 that runs through the anchoring bracket 62. Anchoring bracket 62 is fastened to the side 27 of boat 11 by means of screws 60.

The FIGURES illustrate the invention in a schematic fashion because many changes in the fixturing are contemplated within the purview and scope of this invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A fishing net apparatus, comprising:
   a net supported upon an open frame;
   a shaft carrying said net and frame on a distal end thereof, said shaft having a hinge in a mid-portion, wherein said net and frame are rotatable about said mid-portion, said shaft supporting said frame to position said net and an open portion of said frame facing a current flowing past said shaft and through said net and open portion of said frame;
   a tether connected to said open frame for rotating said net and frame about said hinge;
   a flotation device carried by said shaft for allowing said frame to float within water with said net and open portion of said frame facing said current; and
   a collar, said shaft movably disposed about said collar for allowing said shaft to be thrust into said water.

2. The fishing net apparatus of claim 1, further comprising means for fixing a position of said shaft within said collar.

3. The fishing net apparatus of claim 2, further comprising a bracket, said collar being rotatively carried by said bracket.

4. The fishing net apparatus of claim 3, wherein said bracket is affixed to an edge of a boat.

5. The fishing net apparatus of claim 1, further comprising means for fixing said tether, and henceforth fixing a position of said frame with respect to said hinge.

6. The fishing net apparatus of claim 1, further comprising means operatively connected to said hinge for restricting the articulation thereof to a maximum of a straight line.

7. The fishing net apparatus of claim 1, further comprising a channel, said shaft movably disposed about said channel for allowing said shaft to be thrust into said water.

8. The fishing net apparatus of claim 7, further comprising means for fixing said shaft with respect to said channel.

9. The fishing net apparatus of claim 7, further comprising a bracket, said channel being rotatively carried by said bracket.

10. The fishing net apparatus of claim 9, wherein said bracket is affixed to the edge of a boat.

11. A fishing net apparatus, comprising:
    a net supported upon an open frame;
    a shaft carrying said net and frame on a distal end thereof, said shaft having a hinge in a mid-portion, wherein said net and frame are rotatable about said mid-portion;
    means connected to said open frame for rotating said net and frame about said hinge;
    a flotation device carried by said shaft for allowing said frame to float within water; and
    a collar, said shaft movably disposed about said collar for allowing said shaft to be thrust into said water.

12. The fishing net apparatus of claim 11, further comprising means for fixing a position of said shaft within said collar.

13. The fishing net apparatus of claim 11, further comprising a bracket, said collar being rotatively carried by said bracket.

14. The fishing net apparatus of claim 13, wherein said bracket is affixable to an edge of a boat.

15. The fishing net apparatus of claim 11, wherein said means for rotating said frame with respect to said hinge comprises a tether connected to said frame.

16. The fishing net apparatus of claim 11, wherein said flotation device comprises a collar disposed about said open frame.

17. The fishing net apparatus of claim 11, wherein said flotation device comprises a float ball carried by said shaft.

18. The fishing net apparatus of claim 11, wherein said bracket carries a pair of trunnions upon which said collar is rotatively disposed.

19. The fishing net apparatus of claim 11, wherein said collar has an extension containing a pair of slots that slides over and rests upon said trunnions of said bracket.

20. A fishing net apparatus, comprising:
 a net supported upon an open frame;
 a shaft carrying said net and frame on a distal end thereof;
 a flotation device carried by said shaft for allowing said frame to float within water;
 a channel, said shaft movably disposed about said channel for allowing said shaft to be thrust into said water;
 a bracket fixable to a boat, said bracket for rotatively supporting said channel with respect to said boat; and
 means for affixing said shaft with respect to said channel.

* * * * *